(12) United States Patent
Pettijohn

(10) Patent No.: US 8,880,758 B2
(45) Date of Patent: Nov. 4, 2014

(54) HARMONIC DECIMATION OF REAL TIME DATA FOR UNIQUE WORD (OR SYNC CELL) ACQUISITION IN A LIMITED PROCESSING ENVIRONMENT

(71) Applicant: Lockheed Martin Corporation, Bethesda, MD (US)

(72) Inventor: Billy D. Pettijohn, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 87 days.

(21) Appl. No.: 13/708,475

(22) Filed: Dec. 7, 2012

(65) Prior Publication Data

US 2014/0164652 A1 Jun. 12, 2014

(51) Int. Cl.
*G06F 3/00* (2006.01)
*G06F 13/00* (2006.01)
*G06F 13/12* (2006.01)
*H04J 3/06* (2006.01)
*H04J 3/08* (2006.01)
*H04L 7/08* (2006.01)

(52) U.S. Cl.
CPC ............. *G06F 13/122* (2013.01); *H04J 3/0608* (2013.01); *H04J 3/08* (2013.01); *H04L 7/08* (2013.01)
USPC .............................................. 710/30; 710/33

(58) Field of Classification Search
CPC ............ G10L 10/00; H04N 7/16; H04J 3/04; H04J 3/06; H04J 3/16
USPC ........................................................ 710/30, 33
See application file for complete search history.

(56) References Cited

U.S. PATENT DOCUMENTS

| 6,081,570 | A   | * | 6/2000  | Ghuman et al. | 375/368 |
| 6,298,387 | B1  |   | 10/2001 | Prasad et al. |         |
| 7,046,700 | B1  | * | 5/2006  | Roberts et al. | 370/535 |
| 2007/0164802 | A1 | * | 7/2007 | Rea et al.    | 327/266 |
| 2012/0102538 | A1 | * | 4/2012 | Bansal et al. | 725/151 |
| 2012/0269205 | A1 | * | 10/2012 | Haque et al. | 370/509 |

FOREIGN PATENT DOCUMENTS

| WO | WO 98/02988 A2 | 1/1998 |
| WO | WO 98/02988 A3 | 1/1998 |

OTHER PUBLICATIONS

International Search Report and Written Opinion issued Mar. 7, 2014 in PCT/US2013/069055.

* cited by examiner

*Primary Examiner* — Farley Abad
(74) *Attorney, Agent, or Firm* — Oblon, Spivak, McClelland, Maier & Neustadt, L.L.P.

(57) ABSTRACT

A non-transitory computer-readable medium, method, and system for processing a first data stream being in a first format from a link, the first data stream having a plurality of frames, each frame having a fixed frame length; selecting a plurality of sections of the first data stream based on a harmonic pattern of the first format, each selected section being separated from a neighboring selected section by a fixed separation length that is a whole number multiple of the fixed frame length; and creating a second data stream in a second format that includes a contiguous sequence of the selected sections. The second data stream can be further processed to acquire frame alignment with a reduction of required processing power.

24 Claims, 6 Drawing Sheets

HARMONIC DECIMATION OF REAL TIME DATA FOR UNIQUE WORD (OR SYNC CELL) ACQUISITION IN A LIMITED PROCESSING ENVIRONMENT

BACKGROUND

Many data acquisition systems lack the processing power to acquire data streams and parse data patterns in an exhaustive manner in real time. For example, insufficient processing power is a problem in real-time or offline data processing of high throughput/volume data systems where exhaustive data acquisition is needed but is limited by system constraints. In such high throughput or high volume systems, insufficient processing power and system resources can quickly lead to system bottlenecks, overloading, heating, and other problems.

A traditional solution to the problem of insufficient processing power in such systems has been to increase the processing power of the system by adding additional or more powerful hardware. However, this solution is costly both directly (e.g., additional hardware for real-time data processing of high throughput or high volume data systems can be quite costly especially when using specialized hardware such as field-programmable gate arrays (FPGAs) or application-specific integrated circuits (ASICs)) and indirectly (e.g., additional support systems such as rack space and cabling; programming, system configuration, and technical support; and cooling and power).

SUMMARY

Embodiments of the invention provide a scalable algorithm that addresses the foregoing problems by trading acquisition time with computational power in real time, while not increasing the probability of late lock or false lock contention. The algorithm can be run in real time or can be run offline.

The embodiments provide for a non-transitory computer-readable medium storing instructions, which when executed by a processor, cause the processor to perform the steps of receiving a first data stream being in a first format from a link, the first data stream having a plurality of frames, each frame having a fixed frame length; selecting a plurality of sections of the received data stream based on a harmonic pattern of the first format, each selected section being separated from a neighboring selected section by a fixed separation length that is a whole number multiple of the fixed frame length; and creating a second data stream in a second format that includes a contiguous sequence of the selected sections. The second data stream can be further processed to acquire frame alignment.

The instructions can further cause the processor to calculate the fixed separation length based on an acquisition time of the link.

The first format can be a non-word-aligned format, and each frame can include a payload and a header having a synchronization word. The second format can be a word-aligned format. Further, the step of selecting can include alternating between selecting a plurality of sections of a fixed selection length and discarding a plurality of separator sections of the fixed separation length in a repeating manner.

The step of creating can include creating the second data stream in the second format that includes a contiguous sequence of the selected sections without the separator sections such that the second data stream is in a format having a plurality of new frames, each frame having the fixed frame length.

The embodiments further provide for a method of processing a first data stream including receiving the first data stream in a first format from a link, the first data stream having a plurality of frames, each frame having a fixed frame length; selecting a plurality of sections of the first data stream based on a harmonic pattern of the first format, each selected section being separated from a neighboring selected section by a fixed separation length that is a whole number multiple of the fixed frame length; and creating a second data stream in a second format that includes a contiguous sequence of the selected sections.

The method can further include calculating the fixed separation length based on an acquisition time of the link.

The step of selecting can further include alternating between selecting a plurality of sections of a fixed selection length and discarding a plurality of separator sections of the fixed separation length in a repeating manner.

The step of creating can further include creating the second data stream in the second format that includes a contiguous sequence of the selected sections without the separator sections such that the second data stream is in a format having a plurality of new frames, each frame having the fixed frame length.

The embodiments further provide for a system for processing a first data stream including a receiving unit that is configured to receive the first data stream being in a first format from a link, the first data stream having a plurality of frames, each frame having a fixed frame length; a selection unit that is configured to select a plurality of sections of the first data stream based on a harmonic pattern of the first format, each selected section being separated from a neighboring selected section by a fixed separation length that is a whole number multiple of the fixed frame length; and a creation unit that is configured to create a second data stream in a second format that includes a contiguous sequence of the selected sections. The data stream can be a serial bit stream.

The system can further include a calculation unit that calculates the fixed separation length based on an acquisition time of the link.

The selection unit can include a processing unit that is configured to alternate between selecting a plurality of sections of a fixed selection length and discarding a plurality of separator sections of the fixed separation length in a repeating manner.

The creation unit can be configured to create the second data stream in the second format that includes a contiguous sequence of the selected sections without the separator sections such that the second data stream is in a format having a plurality of new frames, each frame having the fixed frame length.

BRIEF DESCRIPTION OF THE DRAWINGS

Various exemplary embodiments of harmonic decimation of real time data for unique word (or sync cell) acquisition in a limited processing environment to which aspects of the invention are applied will be described in detail with reference to the following drawings in which.

DETAILED DESCRIPTION OF EMBODIMENTS

Embodiments of the invention are described below with reference to FIGS. 1-6.

Figure 1:
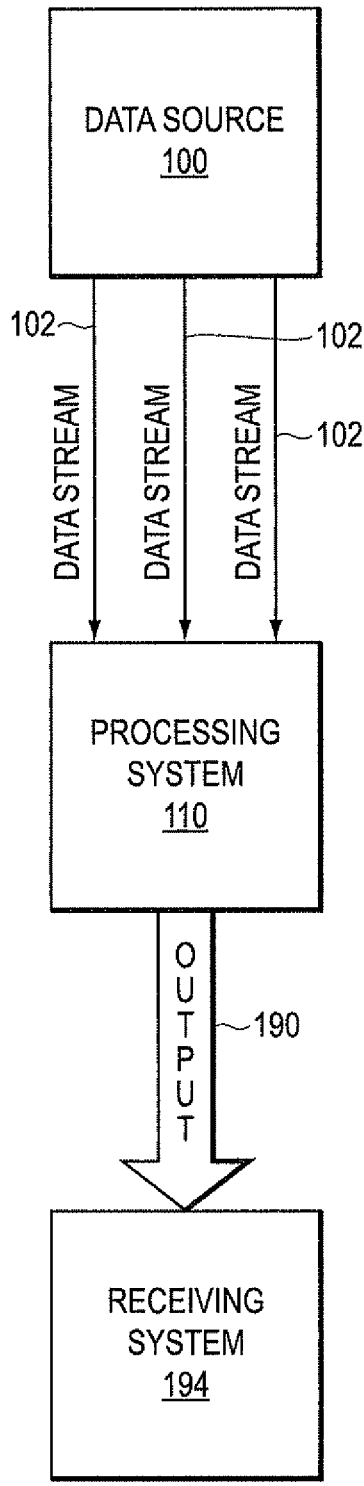
FIG. 1 shows an exemplary block diagram of a generic data acquisition system.

FIG. 1 shows an exemplary block diagram of a generic data acquisition system in which a processing system 110 receives a plurality of data streams 102 from a data source 100, and the processing system 110 produces an output 190 which is sent to a receiving system 194.

The data source 100 can be any source or sources of data that transmit data to the processing system 110. For example, the data source 100 can include one or more environmental sensors (not shown) that measure physical information and convert the measured physical information into electrical signals. Environmental sensors can include an accelerometer, an altimeter, a barometer, a galvanometer, an interferometer, a light sensor, a mass spectrometer, a radio receiver, a seismometer, a thermometer, a voltmeter, any other device that measures real-world physical conditions or properties, or any combination thereof.

The data source 100 can also include conditioning circuitry (not shown) for pre-conditioning measured physical information prior to conversion into an electrical signal. The conditioning circuitry can amplify, filter, isolate, normalize, or otherwise pre-condition the measured physical conditions in any number of ways known to one of skill in the art.

The data source 100 can also include analog-to-digital converters (not shown) that convert the pre-conditioned physical information into an electrical signal that can be processed by one or more processing machines. These electrical signals can include digital values, for example, expressed as serial bit streams that are sent to the processing machines.

The data streams 102 can be streams of data in the form of electrical signals that the data source 100 sends to the processing system 110. The data streams 102 can have digital values, as in the foregoing example, expressed as serial bit streams that are sent to the processing system 110. The data streams can be sent over any transmission media, such as copper wire, telephone lines, coaxial cables, twisted pair cables, optical fiber, or air and space (for example, radio-frequency RF or infrared). The data source 100 has a transmission interface (not shown) for transmitting the data streams 102, and the processing system 110 has a receiver interface (not shown) for receiving the data streams 102 from the transmission media. The transmission interface may also be configured to receive electrical signals such as data streams and the receiver interface may also be configured to transmit electrical signals such as data streams.

After the processing system 110 receives a data stream 102 from the data source 100, the processing system 110 may process the data stream 102 into an output 190 so that it can be accepted by another system, such as the receiving system 194. The processing can include reconstruction, interpolation, extrapolation, parsing, pattern matching, reformatting, truncating, appending, or any other type of data processing that can be performed on data streams 102.

Once the processing by the processing system 110 is complete, the processing system 110 transmits the output 190 to the receiving system 194 via a transmission interface (not shown), and the receiving system 194 receives the output 190 through a receiver interface (not shown).

Some data acquisition systems may have particularly high volumes of data being transmitted by the data source 100. For a present illustrative example, the data streams 102 can be RF serial streams in a wideband environment. Thus, the data sources 100 transmitting the data streams 102 can be RF transmitters each sending relatively high volumes of RF serial streams (e.g., 3.2 Gbps) to the processing system 110. With sufficiently high volumes of RF serial streams being received by the processing system 110, the processing system 110 requires high processing rates to ensure that the message bandwidth does not significantly exceed the coherence bandwidth of the received data. If such a situation occurs, then the processing system 110 becomes a bottleneck, and significant data loss may occur, for example, as retransmissions might time out or as the processing system 110 may refuse or be unable to receive additional data.

Data loss is highly problematic in systems where data reliability is a key feature. Such systems may have little or no tolerance for actual data loss, and thus may use dedicated hardware for processing the data streams. Examples of dedicated hardware for high volume applications include field-programmable gate arrays (FPGAs) and application-specific integrated circuits (ASICs). However, these types of specialized hardware can be expensive to physically deploy, maintain, and scale. Further, non-recurring engineering costs of programming, supporting, and updating specialized dedicated hardware—such as an ASIC—can be cost-prohibitive despite the runtime efficiencies achieved by the low-level programmability of the specialized hardware.

Late lock is also a problem in data acquisition systems. This can occur if the data acquisition system is overwhelmed by the data stream. If the system arbitrarily drops data due to being overwhelmed, the coherent nature of the framed data can be lost and the system may have difficulty acquiring the frame structure. If the stream becomes excessively corrupted by either dropped data or noise, the frame acquisition may take more time than is allotted for the task resulting in system locks.

False lock is also a problem in data acquisition systems. Some sub-optimal data acquisition methods use sparse locking methods or statistically inefficient methods for acquiring lock. These methods can cause intelligence in the system to falsely believe that the system is in a locked state when the data is not correctly aligned, which would yield a corrupted data stream.

Even relatively simple processing operations performed by the processing system 110 can overload an improperly scaled data acquisition system. In keeping with the present illustrative example, the processing system 110 receiving RF serial bit streams from RF transmitters in a 3.2 Gbps wideband environment may be configured to parse the RF serial bit streams and convert the incoming data into a format having word boundaries. To parse the serial streams, the processing system 110 typically performs the following operations in order: acquire the sync cell or unique word, remove skew, acquire an ID, acquire the frame count, correct errors, and format the output. Typically, the most time consuming of these operations is acquiring the sync cell, because every possible bit and bit phase, the phase of the input frames of the RF serial bit stream, must be examined in real time (i.e., at least as fast as the streams are transmitted by the data sources 100) in order to avoid having the processing system 110 become a bottleneck.

Figure 2:
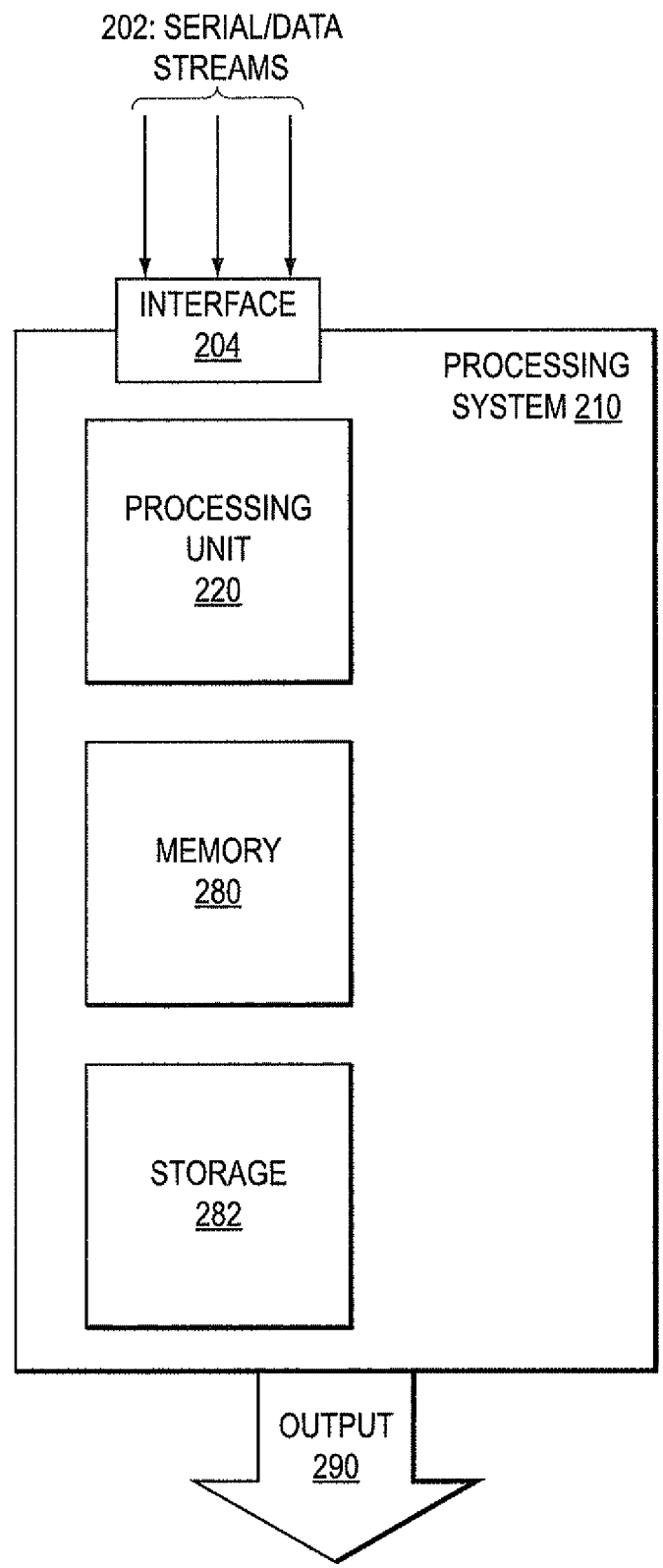
FIG. 2 shows an exemplary block diagram of a processing system of an embodiment.

FIG. 2 shows an exemplary block diagram of a processing system 210 of an embodiment. The processing system 210 can perform similar functions as the processing system 110 to process data streams 202 to output to a receiving system 294. The processing system 210 can be any system configured to process high volumes of data, but preferably includes one or more general purpose computers each with a processing unit 220, a memory 280, and a non-volatile storage 282.

The processing unit 220 can be a single or array of central processing units (CPUs), general purpose graphical processing units (GPGPUs), field-programmable gate arrays (FPGAs), or a combination thereof.

The memory 280 is preferably a fast volatile memory such as dynamic random-access memory (DRAM) or static random-access memory (SRAM) with sufficient specifications for high volume data processing. The memory 280 can be used by the processing unit 220 for temporary storage of data.

The storage 282 can be one or more hard disks, floppy disks, magnetic tape, optical discs, EEPROM, flash memory, holographic memory, any other non-transitory computer-readable medium, or any combination thereof. The storage 280 can be used by the processing unit 220 for temporary or permanent storage.

The processing unit 220 controls the interface to read and process the data streams 202 received by a network interface 204. In the present exemplary embodiment, the processing unit 220 is configured to process RF serial bit streams 202 for output. The processing unit 220 performs one or more operations on the RF serial bit streams 202 and converts the RF serial bit streams 202 into output 290 for a receiving system such as the receiving system 194 shown in FIG. 1.

The processing system 210 of the present exemplary embodiment contains in storage 282 instructions which, when executed by the processing unit 220, causes the processing system 210 to process the RF serial bit streams 202. In keeping with the present illustrative example, processing can include parsing the RF serial bit streams 202 and converting the incoming data into a format having word boundaries. The processing system 210 takes advantage of the harmonic nature of header data in the RF serial bit streams 202 to discard data in a non-destructive fashion and forms the remaining data to lock onto the incoming data structures in the RF serial bit streams 202.

Figure 3:
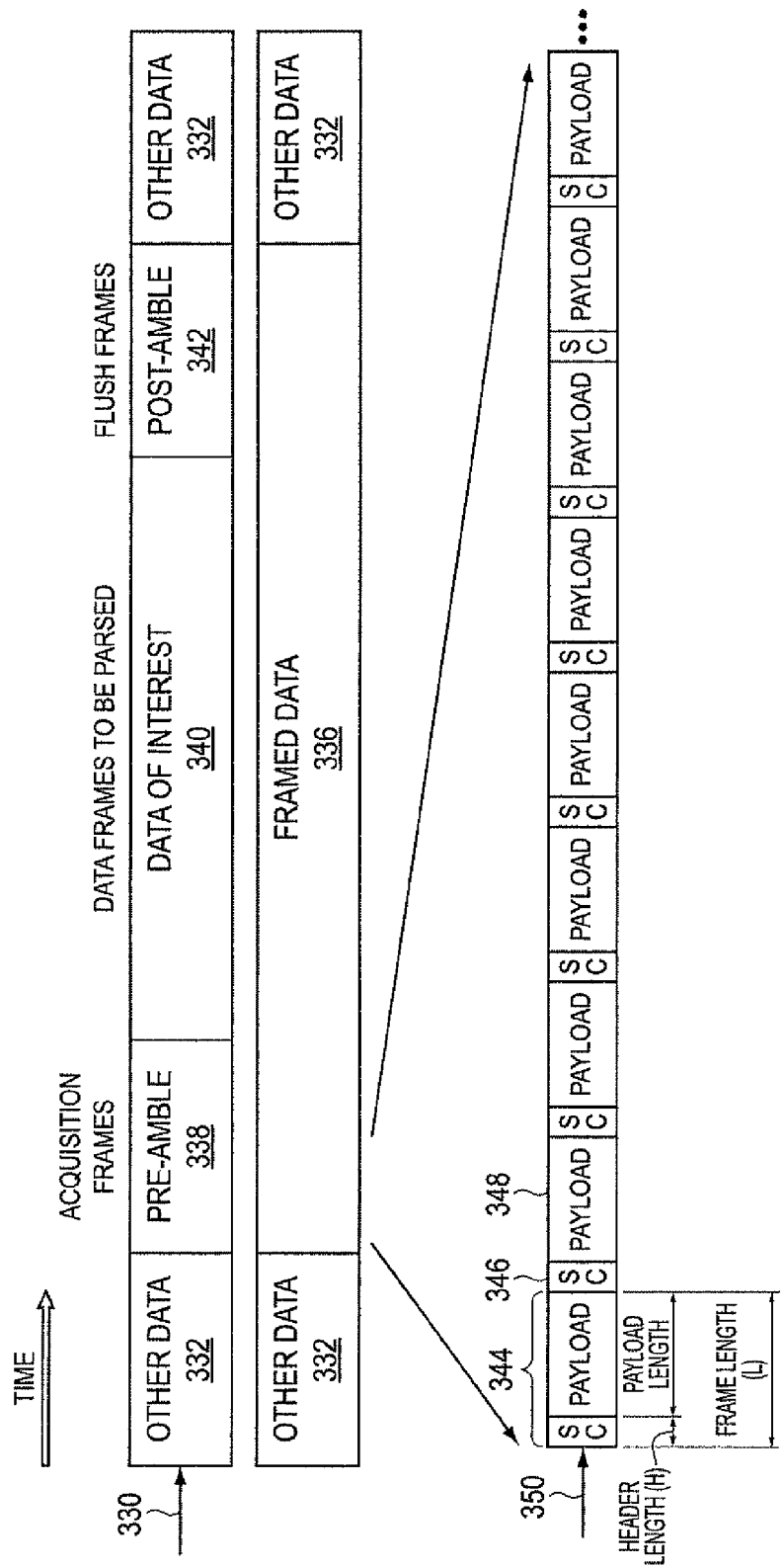
FIG. 3 shows traditional processing of a data stream.

FIG. 3 shows traditional processing of a data stream, for example, an RF serial bit stream. An interface receives the RF serial bit stream as ingested data 330. Only a portion of the bit stream is shown for convenience of illustration. The ingested data 330 includes framed data 336 and other data 332. The framed data 336 is bit stream data composed of frames. Each frame has the same length (frame length L) to ensure regularity and predictability in subsequent processing. A frame includes a payload 348 and a header (or sync cell) 346 to demarcate the boundary of a frame. Each header 346 has a fixed header length H, and each payload 348 has a fixed payload length L-H. Although the header is shown at being at the beginning of a frame in FIG. 3, the header or demarcation can be located at the end of a frame or any other location in the frame. The location is preferably predetermined.

The framed data 336 can include a preamble 338, data of interest 340, and a postamble 342. As components of an RF serial bit stream, the preamble can include acquisition frames, the payload can include data frames to be parsed, and the postamble can include flush frames.

However, in RF transmissions, the ingested data 330 is received by the interface as non-word-aligned data, because RF transmissions may be affected by attenuation, interference, multipath, and other problems that cause the transmission signals to be received in a different boundary than they are transmitted. Thus, processing systems process the RF serial bit streams to convert the non-word-aligned data 350 into word-aligned data (i.e., data having word boundaries). This is traditionally done by searching for sync cells 346 within the framed data 336.

The conversion process can require great amounts of processing power for high volumes of ingested data 330, since the process must search for the sync cells 346 in the framed data 336 and the sync cells 346 have unknown positions and alignment with the rest of the framed data 336. The search is made even slower when the sync cells 346 are only a small fraction of the framed data 336, since the processing system has a lower probability of acquiring a sync cell when acquiring a randomly-selected portion of framed data 336. For example, the sync cells 346 are only about 0.01% of the total data in an RF serial bit stream in a wideband 3.2 Gbps environment, resulting in a significant increase in acquisition time for acquiring the sync cells 346.

Figure 4:
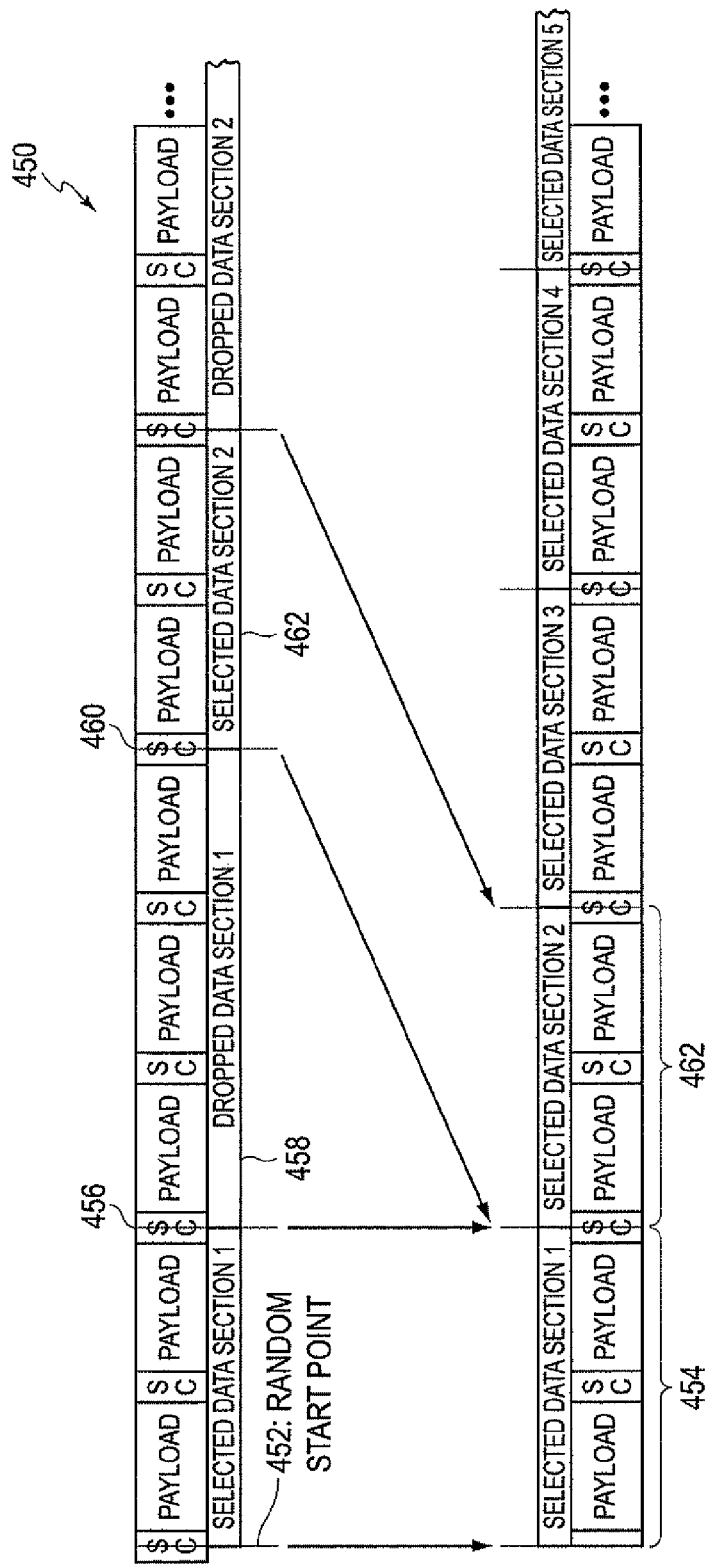
FIG. 4 shows processing of a data stream according to an exemplary embodiment.

FIG. 4 shows processing of an RF serial bit stream according to an exemplary embodiment. The RF serial bit stream has similar components as the ingested data 330 of FIG. 3, and those components are accordingly omitted in FIG. 4.

The processing system of the present exemplary embodiment is configured to increase processing speed by taking advantage of the harmonic nature of header data in the RF serial bit streams in the following manner.

The processing system selects a random start point 452 within the framed data. From the random start point 452, the processing system 210 then selects a section of the framed data, the first selected data section 454. In this present exemplary embodiment, the selected section has fixed length U, which is an integer multiple of the frame length L, for example, twice the frame length L. The frame length L may be calculated by the processing system or manually input into the processing system before the process is executed. For example, the frame length L may be 2880 bits, so the selected consecutive bits have a fixed length U of 5760 bits.

After selecting the first selected data section 454, the processing system then drops (or simply does not select) a consecutive number of bits as the first dropped data section 458 starting from the end 456 of the first selected data section 454. The first dropped data section 458 has length D, which is an integer multiple of the frame length L. In the present exemplary embodiment, D is a fixed length of 8640 bits, equal to three times the frame length L. The fixed length D can be calculated based on the anticipated acquisition time. For example, if the time to acquisition (TTA) is between 80 and 100 milliseconds, and the data is being acquired at around 84 to 106 kbps, then the fixed length D may be calculated to be three times the frame length L, or 8640 bits. The dropped data is data acquired during acquisition sync time and can be decimated without affecting subsequent processing of the data of interest.

The processing system then repeats the process by selecting a consecutive number of bits of fixed length U of the framed data, the second selected data section 462 starting from the end 460 of the dropped (or unselected) bits constituting the first dropped data section 458.

The processing system creates a new data stream by consecutively connecting the selected sections of frame data, i.e., the new data stream includes a continuous sequence of the selected sections in the order they were selected. Importantly, because the dropped (or unselected) sections have lengths that are an integer multiple of the fixed frame length L and the header data occurs harmonically within the frame length L, the created new data stream is guaranteed to have a frame structure that is the same as the frame structure of the non-word-aligned data stream and has fixed frame length L.

This guarantee is illustrated as follows.

Assume that the start point 452 is randomly chosen to be at a bit $b_0$ that is s bits deep into a frame having index fi, where s is an integer between 0 and L−1 inclusive. That is, the start point 452 is at a position in the frame such that there are s bits in the frame before the start point 452 and L−s bits in the frame after the start point 452. The processing system 210 places a marker at this start point.

The processing system selects a first contiguous section of the frame data of fixed length U bits starting from the start point 452 and moves the marker to the end of the selected section. The marker demarcates a position at which U bits before the marker have been selected and which is U bits away from the start point 452. At that position, the marker is in a frame having index $f_j$, where $f_j \geq f_i$. In the frame having index $f_j$, the marker is s+U (mod L) bits deep into the frame. That is, the marker is at a position in the frame such that there are s+U (mod L) bits in the frame before the marker and L−(s+U (mod L)) bits in the frame after the marker.

The processing system then drops (or simply does not select) a consecutive number of bits D, where D=n*L and n is a natural number. The processing system moves the marker to this new position. The marker demarcates a position which is U+D bits away from the start point 452. At that position, the marker is in a frame having index $f_k$, where $f_k \geq f_j \geq f_i$. In the frame having index $f_k$, the marker is s+U+D (mod L) bits deep into the frame. That is, the marker is at a position in the frame such that there are s+U+D (mod L) bits in the frame before the marker and L−(s+U+D (mod L)) bits in the frame after the marker.

Because the frames are a fixed length L and the natural number D was selected to be a multiple of L, the marker is in the same relative position in the frame having index $f_k$ as the relative position of the end of the previously selected section of the framed data in the frame having index $f_j$. That is, both positions are s+U (mod L) bits deep into their respective frames: s+U+D is congruent to s+U (mod L) because D=n*L=0 (mod L).

Because both positions are in the same relative position in their respective frames, the processing system may select a second contiguous section of U bits from the end of the dropped (or unselected) section such that creating a new data stream of bits selected from the first contiguous section followed by bits selected from the second contiguous section does not destroy the inherent frame structure of the framed data. Thus, regardless of the position of the random start point 452 and the number of bits selected, the created data stream has the same inherent frame structure as the ingested data stream.

Figure 5:
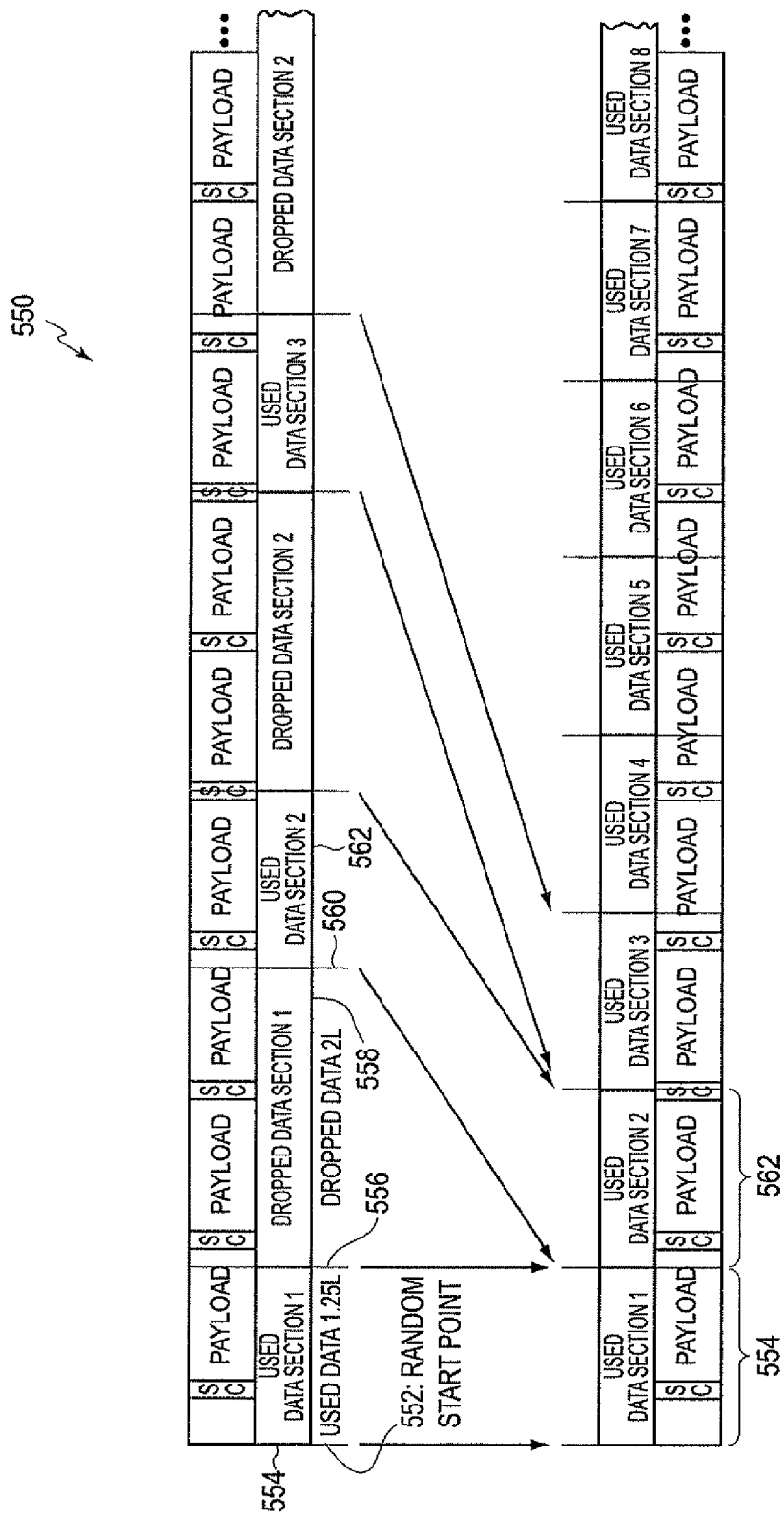
FIG. 5 shows processing of a data stream according to an exemplary embodiment.

FIG. 5 shows processing of an RF serial bit stream according to another exemplary embodiment. The RF serial bit stream has similar components as the ingested data 330 of FIG. 3, and those components are accordingly omitted in FIG. 5.

The processing system of the present exemplary embodiment is configured to increase processing speed by taking advantage of the harmonic nature of header data in the RF serial bit streams in the following manner.

The processing system selects a random start point 552 within the framed data. From the random start point 552, the processing system then selects a section of the framed data, the first selected data section 554. In this present exemplary embodiment, the selected section has fixed length U, which is a non-integer multiple of the frame length L, for example, 1.25 times the frame length L. The frame length L may be calculated by the processing system or manually input into the processing system before the process is executed. For example, the frame length L may be 2880 bits, so the selected consecutive bits have a fixed length U of 3600 bits.

After selecting the first selected data section 554, the processing system then drops (or simply does not select) a consecutive number of bits as the first dropped data section 558 starting from the end 556 of the first selected data section 554. The first dropped data section 558 has length D, which is an integer multiple of the frame length L. In the present exemplary embodiment, D is a fixed length of 5760 bits, equal to two times the frame length L. The fixed length D can be calculated based on the anticipated acquisition time. The dropped data is data acquired during acquisition sync time and can be decimated without affecting subsequent processing of the data of interest.

The processing system then repeats the process by selecting a consecutive number of bits of fixed length U of the framed data, the second selected data section 562 starting from the end 560 of the dropped (or unselected) bits constituting the first dropped data section 558.

The processing system creates a new data stream by consecutively connecting the selected sections of frame data, i.e., the new data stream includes a continuous sequence of the selected sections in the order they were selected. Importantly, because the dropped (or unselected) sections have lengths that are an integer multiple of the fixed frame length L and the header data occurs harmonically within the frame length L, the created new data stream is guaranteed to have a frame structure that is the same as the frame structure of the non-word-aligned data stream and has fixed frame length L.

Similar to the exemplary embodiment of FIG. 4, in FIG. 5, the inherent frame structure is preserved because each selected data section (after the first) starts at a position in a frame precisely where the preceding selected data section ended in another frame. Further, the sync cells 446 can be acquired more quickly than in the traditional method. Because the inherent frame structure is preserved and the processing can be performed in real time, the processing of the exemplary embodiments does not increase the probability of late block or false lock.

The processing of the exemplary embodiment achieves an approximately linear trade-off between probabilistic acquisition time and required processing power, and the selected length U and dropped length D variables can be adjusted to allow the system to acquire data in real-time, i.e., as it is ingested.

As shown in FIG. 3, the traditional method processes the entire ingested data stream. Assume that the traditional method acquires a data set of size P in a nominal acquisition time T.

In the exemplary embodiments illustrated in FIGS. 4 and 5, the processing acquires a data set of size $P_x$, where $$P_x = \frac{U}{U+D}P$$

In the exemplary embodiments illustrated in FIGS. 4 and 5, the processing acquires a data set of size $P_x$ in acquisition time of $T_x$, where $$T_x = \frac{U+D}{U}T$$

For example, in the exemplary embodiment illustrated in FIG. 4, the processing only sees 40% of the data stream with the acquisition time becoming 250% of the nominal acquisition time.

$$P_x = \frac{2L}{2L+3L}P = 0.4P$$

and $$T_x = \frac{2L+3L}{2L}T = 2.5T$$

Similarly, in the exemplary embodiment illustrated in FIG. 5, the processing only sees 38.5% of the data stream with the acquisition time becoming 260% of the nominal acquisition time.

$$P_x = \frac{1.25L}{1.25L+2L}P = 0.385P$$

and $$T_x = \frac{1.25L+2L}{1.25L}T = 2.6T$$

Thus, the foregoing embodiments achieve similar processing gains in reducing the amount of processed data for subsequent processing operations. Systems can have an excess of framed data in the preamble portion of the data stream for which to acquire the frame structure. Although those systems acquire well within the send preamble, the disclosed embodiments allow a system to use less processing power to acquire with a tradeoff of using more preamble. As the decimated data is not used, the increase in acquisition time can have a negligible effect. The throughput processing time is not directly dependent upon the acquisition time and is therefore not affected. For example, going from 1 ms to 2.5 ms in acquisition time for a 30 minute signal can be inconsequential, but requiring 40% additional processing power can be significant.

The sizes of the selected sections U and dropped sections D can be customized to the particular system capabilities. $P_x$ has a linear relationship with U and an inverse linear relationship with D. $T_x$ has a linear relationship with D and an inverse linear relationship with U. Thus, to reduce the size of the data set to be processed $P_x$, for example, D may be increased or U may be decreased. To reduce the acquisition time $T_x$, for example, U may be increased or D may be decreased.

Figure 6:
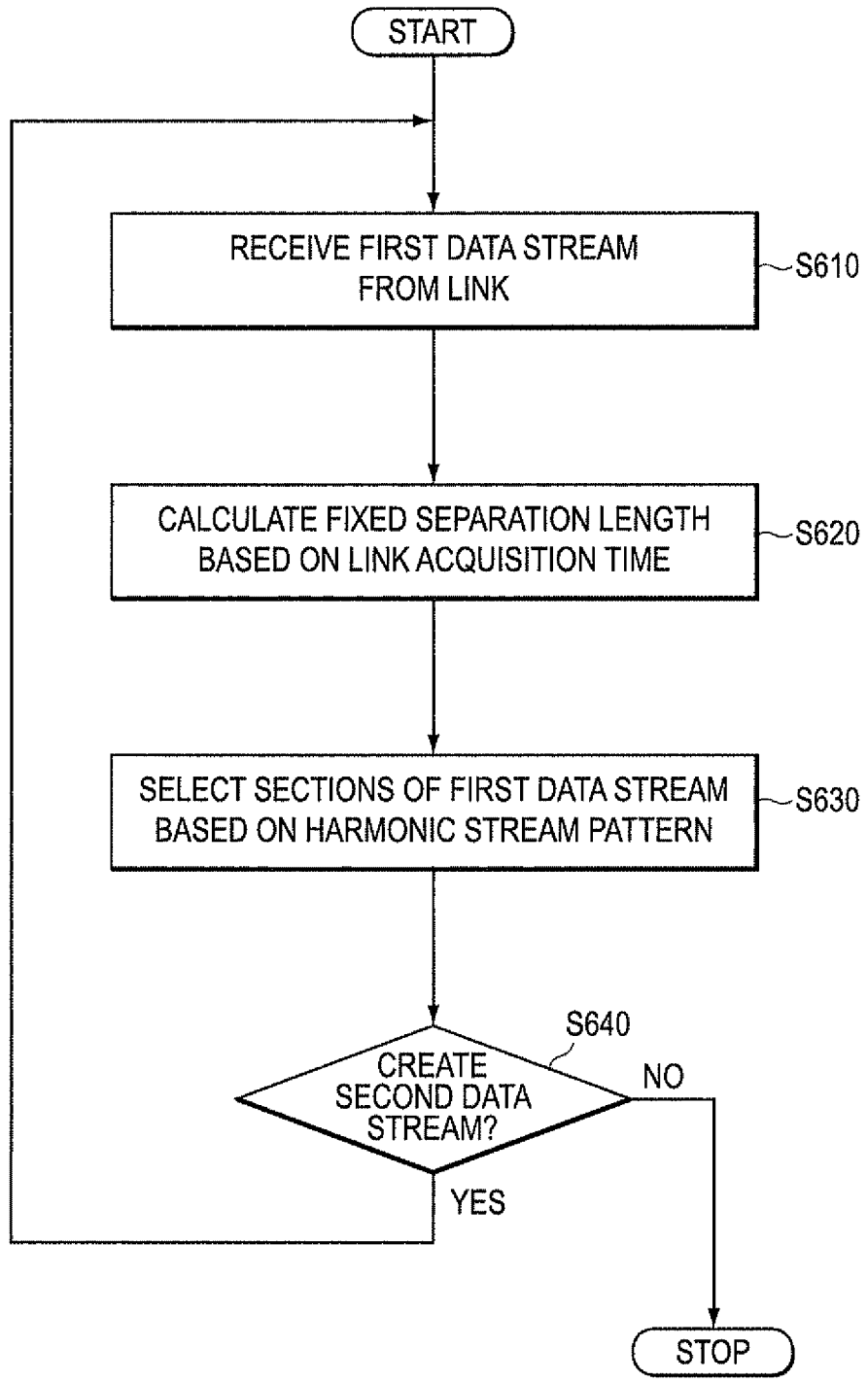
FIG. 6 shows an exemplary process of an embodiment.

FIG. 6 shows an exemplary process of an embodiment. The process first receives a first data stream from a link or interface in step S610. Then, the process calculates a fixed separation length (length of bits separating selected sections, i.e., dropped or decimated data sections) based on link acquisition time in step S620. Then, the process selects contiguous sections of the first data stream based on a harmonic stream pattern in step S630. Then, the process creates a second data stream based on the selected contiguous sections of the first data stream in step S640. The process may repeat back to step S610 if more data streams are available to be processed or may end if no more data streams are available to be processed.

Various modifications can be made to embodiments without departing from the spirit of the invention.

In one modification, the length of selected sections is not predetermined prior to selection, but may be changed dynamically during selection. When the length of the selected sections is predetermined, the speed of processing may increase, but the length of the selected sections may also vary depending on a variety of factors including space and memory considerations.

In another modification, the length of the dropped sections is not predetermined prior to selection, but may be changed dynamically during selection. When the length of the dropped sections is predetermined, the speed of processing may increase, but the length of the dropped sections may also vary depending a variety of factors including detected and/or adjusted acquisition time. For example, when the acquisition time during an initial period is 80 milliseconds and the acquisition time later increases to 160 milliseconds, D may be adjusted from 3*L to 6*L. Of course, the relationship does not have to be linear or even proportional. D may be adjusted on the fly depending on detected changing factors such as acquisition time.

The amount of used data "U" or dropped data "D" may vary based upon the amount of processing power that is available on a cloud system or the number of errors in the data stream. An error, for example an incorrect bit invoked by the link, can increase the baseline acquisition time. These factors do not generally vary independently, but rather the ratio is calibrated to achieve targeted reductions in processing power.

In another modification, the calculation step S620 may be omitted and the separation length D can be preprogrammed into the processing system customized to the data acquisition system's specifications.

In another modification, the algorithm can be run offline rather than in real time.

The foregoing embodiments can be fully implemented in software and hardware. Because they can be fully implemented in software, generic processing systems can be scaled more efficiently to process high volumes of data as the foregoing embodiments can thus be applied on any processing system that is moving to a software centric bit level or bit level front-end processing system. The embodiments may also be applicable for any program using bit level patterns, such as with programmable TDM switches.

The illustrated exemplary embodiments of the harmonic decimation of real time data for unique word (or sync cell) acquisition in a limited processing environment as set forth above are intended to be illustrative and not limiting. Various changes may be made without departing from the spirit and scope of the invention.

What is claimed is:

1. A non-transitory computer-readable medium storing instructions, which when executed by a processor, cause the processor to perform the following steps:
   receiving a first data stream being in a first format from a link, the first data stream having a plurality of frames, each frame having a fixed frame length;
   selecting a plurality of sections of the first data stream based on a harmonic pattern of the first format, each selected section being separated from a neighboring selected section by a fixed separation length that is a whole number multiple of the fixed frame length; and
   creating a second data stream in a second format that includes a contiguous sequence of the selected sections, wherein
   the second data stream has a frame structure that is the same as a frame structure of the first data stream, and
   each frame of the second data stream has the fixed frame length.

2. The non-transitory computer-readable medium of claim 1, further causing the processor to perform the step of:
   calculating the fixed separation length based on an acquisition time of the link.

3. The non-transitory computer-readable medium of claim 1, wherein the first format is a non-word-aligned format, and each frame includes a payload and a header having a synchronization word.

4. The non-transitory computer-readable medium of claim 1, wherein the second format is a word-aligned format.

5. The non-transitory computer-readable medium of claim 1, wherein
   the step of selecting includes alternating between selecting a plurality of sections of a fixed selection length and discarding a plurality of separator sections of the fixed separation length in a repeating manner.

6. The non-transitory computer-readable medium of claim 5, wherein
   the step of creating includes creating the second data stream in the second format that includes a contiguous sequence of the selected sections without the separator sections such that the second data stream is in a format having a plurality of new frames.

7. The non-transitory computer-readable medium of claim 1, wherein
the step of selecting includes determining a start point of a first section of the plurality of sections at a random point within one of the plurality of frames of the first data stream.

8. The non-transitory computer-readable medium of claim 1, wherein
the step of selecting includes dropping data separating the plurality of sections of the first data stream.

9. A method of processing a first data stream comprising:
receiving the first data stream in a first format from a link, the first data stream having a plurality of frames, each frame having a fixed frame length;
selecting a plurality of sections of the first data stream based on a harmonic pattern of the first format, each selected section being separated from a neighboring selected section by a fixed separation length that is a whole number multiple of the fixed frame length; and
creating a second data stream in a second format that includes a contiguous sequence of the selected sections, wherein
the second data stream has a frame structure that is the same as a frame structure of the first data stream, and
each frame of the second data stream has the fixed frame length.

10. The method of claim 9, further comprising:
calculating the fixed separation length based on an acquisition time of the link.

11. The method of claim 9, wherein
the first format is a non-word-aligned format, and
each frame includes a payload and a header having a synchronization word.

12. The method of claim 9, wherein
the second format is a word-aligned format.

13. The method of claim 9, wherein
the step of selecting further includes alternating between selecting a plurality of sections of a fixed selection length and discarding a plurality of separator sections of the fixed separation length in a repeating manner.

14. The method of claim 13, wherein
the step of creating further includes creating the second data stream in the second format that includes a contiguous sequence of the selected sections without the separator sections such that the second data stream is in a format having a plurality of new frames.

15. The method of claim 9, wherein
the step of selecting includes determining a start point of a first section of the plurality of sections at a random point within one of the plurality of frames of the first data stream.

16. The method of claim 9, wherein
the step of selecting includes dropping data separating the plurality of sections of the first data stream.

17. A system for processing a first data stream comprising:
a receiving unit that is configured to receive the first data stream being in a first format from a link, the first data stream having a plurality of frames, each frame having a fixed frame length;
a selection unit that is configured to select a plurality of sections of the first data stream based on a harmonic pattern of the first format, each selected section being separated from a neighboring selected section by a fixed separation length that is a whole number multiple of the fixed frame length; and
a creation unit that is configured to create a second data stream in a second format that includes a contiguous sequence of the selected sections, wherein
the second data stream has a frame structure that is the same as a frame structure of the first data stream, and
each frame of the second data stream has the fixed frame length.

18. The system of claim 17, further comprising:
a calculation unit that calculates the fixed separation length based on an acquisition time of the link.

19. The system of claim 17, wherein
the first format is a non-word-aligned format, and
each frame includes a payload and a header having a synchronization word.

20. The system of claim 17, wherein
the second format is a word-aligned format.

21. The system of claim 17, wherein
the selection unit includes a serial processing unit that is configured to alternate between selecting a plurality of sections of a fixed selection length and discarding a plurality of separator sections of the fixed separation length in a repeating manner.

22. The system of claim 21, wherein
the creation unit is configured to create the second data stream in the second format that includes a contiguous sequence of the selected sections without the separator sections such that the second data stream is in a format having a plurality of new frames.

23. The system of claim 17, wherein
the selection unit is configured to determine a start point of a first section of the plurality of sections at a random point within one of the plurality of frames of the first data stream.

24. The system of claim 17, wherein
the selection unit includes a serial processing unit that is configured to drop data separating the plurality of sections of the first data stream.

* * * * *